(12) United States Patent
Huang et al.

(10) Patent No.: US 12,294,307 B2
(45) Date of Patent: May 6, 2025

(54) SYSTEM AND METHODS FOR REDUCING AUXILIARY TRANSFORMER WINDING TURNS

(71) Applicant: Navitas Semiconductor Limited, Dublin (IE)

(72) Inventors: Xiucheng Huang, Torrance, CA (US); Bin Li, Pleasanton, CA (US); Weijing Du, Torrance, CA (US); Yun Zhou, Shenzhen (CN)

(73) Assignee: NAVITAS SEMICONDUCTOR LIMITED, Dublin (IE)

( * ) Notice: Subject to any disclaimer, the term of this patent is extended or adjusted under 35 U.S.C. 154(b) by 225 days.

(21) Appl. No.: 17/822,112

(22) Filed: Aug. 24, 2022

(65) Prior Publication Data

US 2023/0067022 A1    Mar. 2, 2023

Related U.S. Application Data

(60) Provisional application No. 63/263,991, filed on Nov. 12, 2021.

(30) Foreign Application Priority Data

Aug. 27, 2021 (CN) .......................... 202110994393.2

(51) Int. Cl.
*H02M 3/335* (2006.01)
(52) U.S. Cl.
CPC .............................. *H02M 3/33523* (2013.01)

(58) Field of Classification Search
CPC ................................................ H02M 3/33523
See application file for complete search history.

(56) References Cited

U.S. PATENT DOCUMENTS

| | | | | |
|---|---|---|---|---|
| 5,838,556 A | * | 11/1998 | Yokoyama | H02M 3/3385 363/21.16 |
| 6,185,112 B1 | * | 2/2001 | Nishida | H02M 3/3385 363/19 |
| 6,285,566 B1 | * | 9/2001 | Nakahira | H02M 3/3385 363/19 |
| 9,601,982 B1 | * | 3/2017 | Zhang | H02M 3/33507 |
| 10,418,906 B2 | * | 9/2019 | Yang | H02M 3/33507 |
| 10,749,444 B1 | * | 8/2020 | Chan | H02M 7/5395 |
| 2010/0002480 A1 | * | 1/2010 | Huynh | H02M 3/335 363/90 |
| 2013/0329469 A1 | * | 12/2013 | Kubota | H02M 3/33507 363/21.16 |
| 2022/0077786 A1 | * | 3/2022 | Yang | H02M 3/33523 |
| 2023/0143191 A1 | * | 5/2023 | Endo | H02M 1/0022 363/21.12 |

* cited by examiner

*Primary Examiner* — Rafael O De Leon Domenech
(74) *Attorney, Agent, or Firm* — FisherBroyles, LLP

(57) ABSTRACT

Systems and methods for reducing auxiliary transformer winding turns are disclosed. In one aspect, a circuit includes a transformer having a primary winding, a secondary winding and an auxiliary winding having a first end and a second end, a diode having a cathode and an anode, the anode coupled to the first end of the auxiliary winding, and a capacitor having a first terminal coupled to the second end of the auxiliary winding, and a second terminal coupled to the cathode.

20 Claims, 4 Drawing Sheets

SYSTEM AND METHODS FOR REDUCING AUXILIARY TRANSFORMER WINDING TURNS

CROSS-REFERENCE TO RELATED APPLICATIONS

The present application claims priority to Chinese Patent Application No. 202110994393.2 filed on Aug. 27, 2021, entitled "POWER SUPPLY CIRCUIT FOR WIDE OUTPUT VOLTAGE ISOLATION DC-DC CONVERTER", and U.S. Provisional Patent Application No. 63/263,991, filed on Nov. 12, 2021, entitled "SYSTEM AND METHODS FOR REDUCING AUXILIARY WINDING TURNS IN TRANSFORMERS", the contents of all of which are incorporated herein by reference in their entirety for all purposes.

FIELD

The described embodiments relate generally to transformers used in power converters, and more particularly, the present embodiments relate to systems and methods for reducing number of winding turns in auxiliary transformers.

BACKGROUND

Electronic devices such as computers, servers and televisions, among others, employ one or more electrical power conversion circuits to convert one form of electrical energy to another. Some electrical power conversion circuits convert a high DC voltage to a lower DC voltage using a circuit topology called a half bridge converter. As many electronic devices are sensitive to size and efficiency of the power conversion circuit, new power converters can provide relatively higher efficiency and lower size for the new electronic devices.

SUMMARY

In some embodiments, a circuit is disclosed. The circuit includes a transformer having a primary winding, a secondary winding and an auxiliary winding having a first end and a second end, a diode having a cathode and an anode, the anode coupled to the first end of the auxiliary winding, and a capacitor having a first terminal coupled to the second end of the auxiliary winding, and a second terminal coupled to the cathode.

In some embodiments, the diode is a first diode and the circuit further includes a second diode having a second anode and a second cathode, the second anode coupled to the second terminal of the capacitor.

In some embodiments, the circuit further includes a third diode having a third anode and a third cathode, the third anode coupled to the first terminal of the capacitor.

In some embodiments, the circuit further includes a switch having a gate terminal, a drain terminal and a source terminal.

In some embodiments, the drain terminal is coupled to the second cathode and the source terminal is coupled to the third cathode.

In some embodiments, the gate terminal is coupled to a Zener diode.

In some embodiments, the circuit further includes a resistor coupled between the gate terminal and the second cathode.

In some embodiments, the switch is a metal-oxide-semiconductor field effect transistor (MOSFET).

In some embodiments, the switch is a bipolar junction transistor (BJT).

In some embodiments, a circuit is disclosed. The circuit includes a transformer having a primary winding, a secondary winding, and a first and second auxiliary windings, the first auxiliary winding having a first end and a second end, a diode having a cathode and an anode, the anode coupled to a first end of the first auxiliary winding, a capacitor having a first terminal coupled to the second end of the first auxiliary winding, and a second terminal coupled to the cathode.

In some embodiments, the first end of the second auxiliary winding is coupled to the second auxiliary winding.

In some embodiments, the diode is a first diode, and the circuit further includes a second diode having a second anode and a second cathode, the second anode coupled to the second terminal of the capacitor.

In some embodiments, the circuit further includes a third diode having a third anode and a third cathode, the third anode coupled to the first terminal of the capacitor.

In some embodiments, the circuit further includes a switch having a gate terminal, a drain terminal and a source terminal.

In some embodiments, the drain terminal is coupled to the second cathode and the source terminal is coupled to the third cathode.

In some embodiments, the gate terminal is coupled to a Zener diode.

In some embodiments, the circuit further includes a resistor coupled between the gate terminal and the second cathode.

In some embodiments, the switch is a metal-oxide-semiconductor field effect transistor (MOSFET).

In some embodiments, the switch is a bipolar junction transistor (BJT).

In some embodiments, the circuit is arranged to receive an input voltage at the primary winding and generate an output voltage at the third cathode, the output voltage being substantially lower than the input voltage.

DETAILED DESCRIPTION

Figure 1:
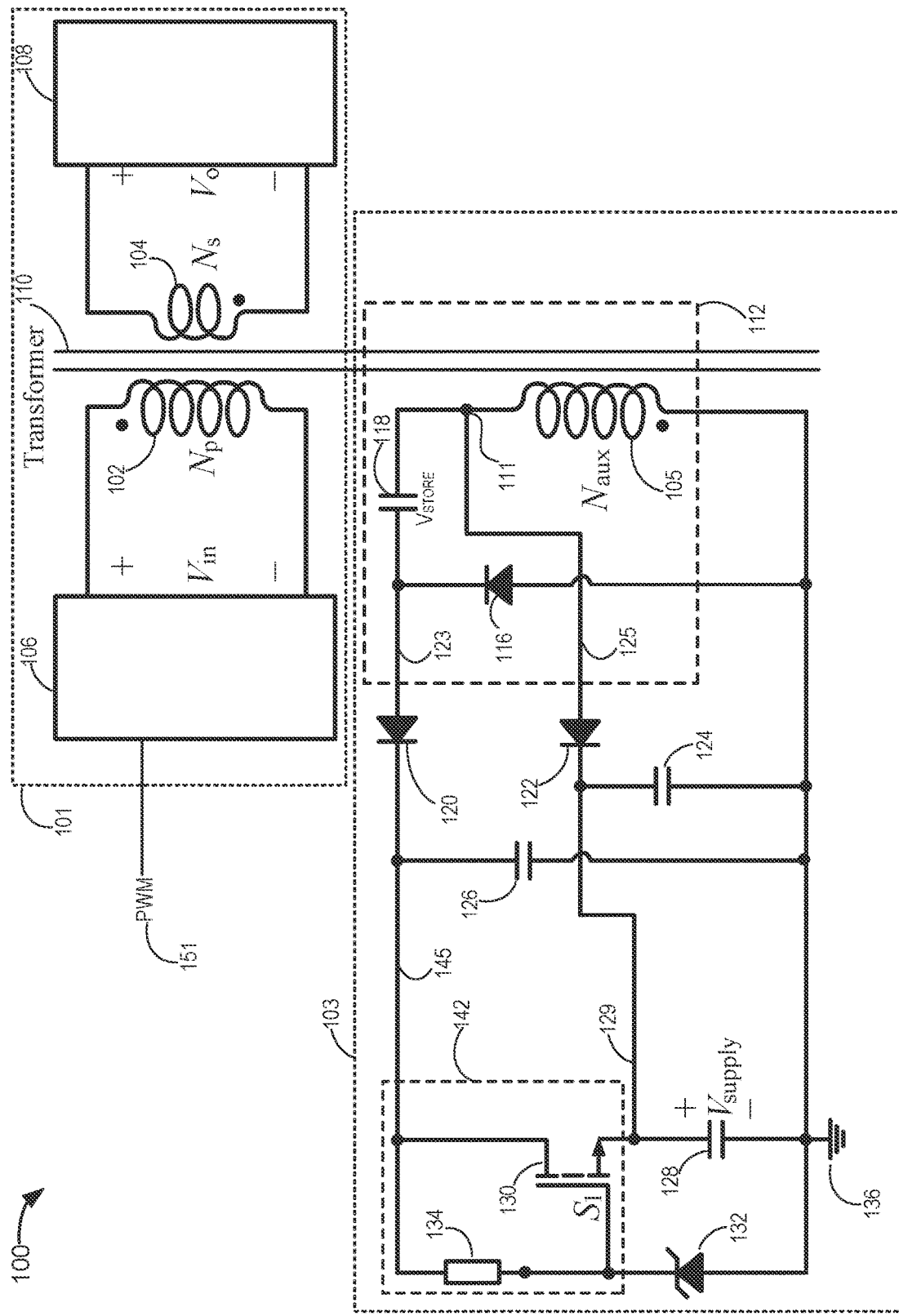
FIG. 1 illustrates an isolated DC-DC power converter circuit with an auxiliary power circuit according to an embodiment of the disclosure.

Circuits, structures and related techniques disclosed herein relate generally to power converters. More specifically, circuits, structures and related techniques disclosed herein relate to systems and methods for reducing number of winding turns in auxiliary transformers that are used in power converters. In some embodiments, a reduction in the number of turns of the auxiliary winding can provide more space for the primary winding of the transformer. This can reduce the DC resistance of the primary winding resulting in an overall improvement in efficiency of the power converter. In various embodiments, systems and methods for reducing auxiliary winding turns in the transformers can substantially reduce maximum voltages of internal nodes of the power converter. In this way, a reduction in dV/dt in the power converter can be achieved, resulting in a reduction of the power converter's electromagnetic interference (EMI) shielding requirements, thus saving system costs.

The reduction in the maximum voltages of internal nodes of the power converter can reduce the voltage rating specifications for the power converter's components, such as transistors, diodes and capacitors, resulting in further cost savings by enabling use of lower voltage rated components. In various embodiments, systems and methods for reducing the number of auxiliary winding turns in transformers can be utilized in isolated DC-DC power converters to improve efficiency of the power converter and to reduce system costs. In some embodiments, circuits, structures and related techniques disclosed herein can allow the isolated DC-DC power converter to have a relatively wide output voltage range. This can be useful in applications, such as but not limited to, charging portable devices and laptop computers. Various inventive embodiments are described herein, including methods, processes, systems, devices, and the like.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

FIG. 1 illustrates an isolated DC-DC power converter circuit 100 with an auxiliary power circuit according to an embodiment of the disclosure. As shown in FIG. 1, the isolated DC-DC power converter circuit 100 can include a main circuit 101 and an auxiliary power circuit 103. The isolated DC-DC power converter circuit 100 can include a transformer having a primary side winding 102, a magnetic core 110, a secondary side winding 104 and an auxiliary winding 105. The auxiliary winding 105 can have a first end that is coupled to connection node 111 and a second end that is coupled to ground 136. The primary side winding 102 can have a number of winding turns Np and the secondary side winding 104 can have a number of windings Ns. The transformer can provide isolation between an input circuit 106 and an output circuit 108. The auxiliary winding 105 can form an auxiliary power supply. Due to electromagnetic induction, the auxiliary winding 105 can obtain energy from the secondary side winding 104. In this way, the auxiliary power circuit 103 can be used to provide energy at node 129 ($V_{SUPPLY}$) for internal components such as control ICs and gate driver ICs.

Embodiments of the present disclosure can prevent a shut down or an overvoltage condition in a power converter when an input voltage (Vin) into the power converter changes significantly, or an output voltage (Vo) of the power converter changes significantly. The input voltage (Vin) into the power converter may change, for example, from 100 V to 400 VAC, and the output voltage (Vo) of the converter may change, for example, from 3.0 V to 20 V in applications such as charging applications for portable devices or laptop computers. As appreciated by one of skill in the art having the benefit of this application these voltage ranges are for example and other suitable voltage ranges can be used. In some embodiments, the isolated DC-DC power converter circuit 100 can provide a relatively wide range of output voltages, for example, output voltages ranging from 3.0 V to 20 V, while providing a stable power supply for internal components of the power converter.

The auxiliary power circuit 103 can include a charging circuit 112. In some embodiments the charging circuit 112 may include a capacitor 118 and a diode 116. The capacitor 118 can be coupled to the auxiliary winding 105 at a connection node 111. The auxiliary power circuit 103 can also include a diode 120 that is connected to the capacitor 118 and to the diode 116. The auxiliary power circuit 103 can further include a diode 122 that is connected to the capacitor 118 and to auxiliary winding 105. Diodes 120 and 122 are arranged to provide rectified power ($V_{supply}$) at an output of the auxiliary power circuit 103 at node 129. A capacitor 124 can be connected to between diode 122 and ground. A capacitor 128 can be connected between node 129 and ground to store the $V_{supply}$ energy at node 129. Node 129 can also be connected to an output of a regulator 142. In some embodiments, regulator 142 can be include a switch 130 and a resistor 134. In various embodiments, switch 130 can be a MOSFET. In some embodiments, switch 130 may be an N-type MOSFET. When the voltage at node 145 is high, the switch 130 can turn on and pass the voltage at node 145 to node 129. The gate of the switch 130 can be connected to a Zener diode 132. The Zener diode 132 can have a breakdown voltage that can range, for example, from 12 V to 18 V. The Zener diode 132 can prevent the voltage at node 129 from exceeding a preset value, namely the breakdown voltage of the Zener diode 132. The auxiliary power circuit 103 can be referenced to a ground node 136.

A pulse width modulated (PWM) signal 151 can be fed into the isolated DC-DC power converter circuit 100 through the input circuit 106 that drives the primary side inductor 102. When the PWM signal is high, a current in the primary side winding 102 can increase. This can induce charging of the auxiliary winding 105. When the auxiliary winding 105 is charged, the diode 116 can turn on. This results in charging of the capacitor 118 and a voltage $V_{store}$ develops across the capacitor 118. Due to Kirchhoff's voltage law, the voltage across the auxiliary winding 105 is approximately equal to $V_{store}$. The voltage across capacitor 118 ($V_{store}$) can produce a relatively high voltage at node 123 (Vino). Ville, causes the diode 120 to turn on. This can turn on the regulator 142 and charge the capacitor 128 ($V_{supply}$). $V_{supply}$ can be used for supplying power to components in the power converter circuit such as control ICs and gate driver ICs. Thus, by including the capacitor 118 in series with the auxiliary winding 105, a separate high voltage node 123 is created while not affecting a voltage at node 125 ($V_{low}$). Further, by creating the high voltage node 123 the number of turns in the auxiliary winding 105 can be reduced because less turns are needed to produce the high voltage at node 123.

When PWM is low, the secondary side winding 104 causes charging of the auxiliary winding 105. The diode 116 is off while diode 122 or diode 120 is on and charging capacitor 128. During this period, the auxiliary winding 105 can function in a flyback mode. The voltage across capacitor 126 can be approximately equal to the voltage across capacitor 118 ($V_{store}$) plus the voltage across the auxiliary winding 105. The values of the node voltages \T$_{high}$, $V_{low}$ and $V_{store}$ are given by:

$$V_{high} = \frac{N_{aux}}{N_s} V_o + V_{store} \quad (1)$$

$$V_{low} = \frac{N_{aux}}{N_s} V_o \quad (2)$$

$$V_{store} = \frac{N_{aux-c}}{N_p} V_{in} \quad (3)$$

where $N_{aux}$ and $N_s$ are the number of turns of the auxiliary winding and the secondary winding, respectively, $N_{aux-c}$ is the effective number of turns of the auxiliary winding which charges the capacitor 118. In this example, Naux-c=Naux. $N_p$ is the number of turns of the primary winding, $V_o$ is the output voltage, and $V_{in}$ is the input voltage. Therefore, $V_{high}$ is given by:

$$V_{high} = \frac{N_{aux}}{N_s} V_o + \frac{N_{aux}}{N_p} V_{in} \quad (4)$$

As can be seen in Eq. 4, $V_{high}$ depends on the number of turns in the secondary winding Ns and the number of turns in the primary winding Np. $V_{high}$ is used to charge up $V_{supply}$. Thus, $V_{supply}$ is supplied with energy in every cycle of PWM. When the voltage across the secondary side winding $V_o$ is high, $V_{supply}$ is supplied by the node 125 through the diode 122. When $V_o$ is low, $V_{supply}$ is supplied by the node 123 through the diode 120. Therefore, $V_{supply}$ can get enough energy whether $V_o$ is high or low in the auxiliary power circuit 103. In this way, a reduced number of winding turns can be used in the auxiliary winding 105.

Figure 2:
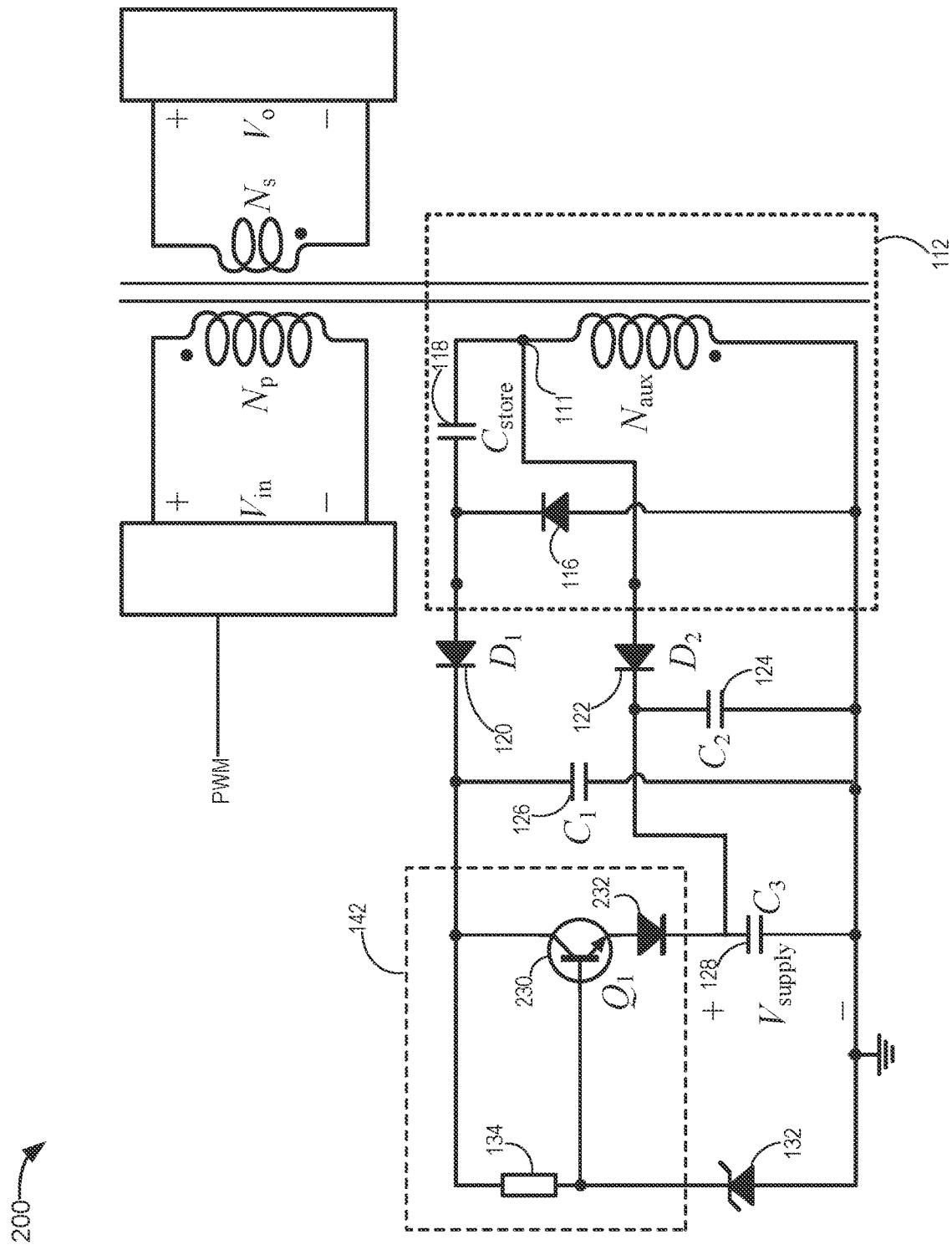
FIG. 2 illustrates an isolated DC-DC power converter circuit suitable for low voltage output applications according to an embodiment of the disclosure.

Now turning to FIG. 2, an isolated DC-DC power converter circuit 200 is illustrated that is similar to the DC-DC power converter circuit 100, however the switch 130 in FIG. 1 has been replaced by an NPN bipolar transistor 230, according to an embodiment of the disclosure. This embodiment can be suitable for relatively low output voltage applications. In the illustrated embodiment, an NPN bipolar transistor 230 and a diode 232 are used to form the regulator 142. The NPN bipolar transistor 230 can have a relatively low on-voltage that is equal to its collector to emitter voltage (Vce). A low voltage drop across the collector to emitter of the NPN bipolar transistor 230 can reduce the voltage drop from node 145 to node 129. Thus, node 129 can operate down to relatively low output voltages, for example, 3.3 V. This low output voltage can be used in applications, such as but not limited to, for charging of portable devices or laptop computers.

Figure 3:
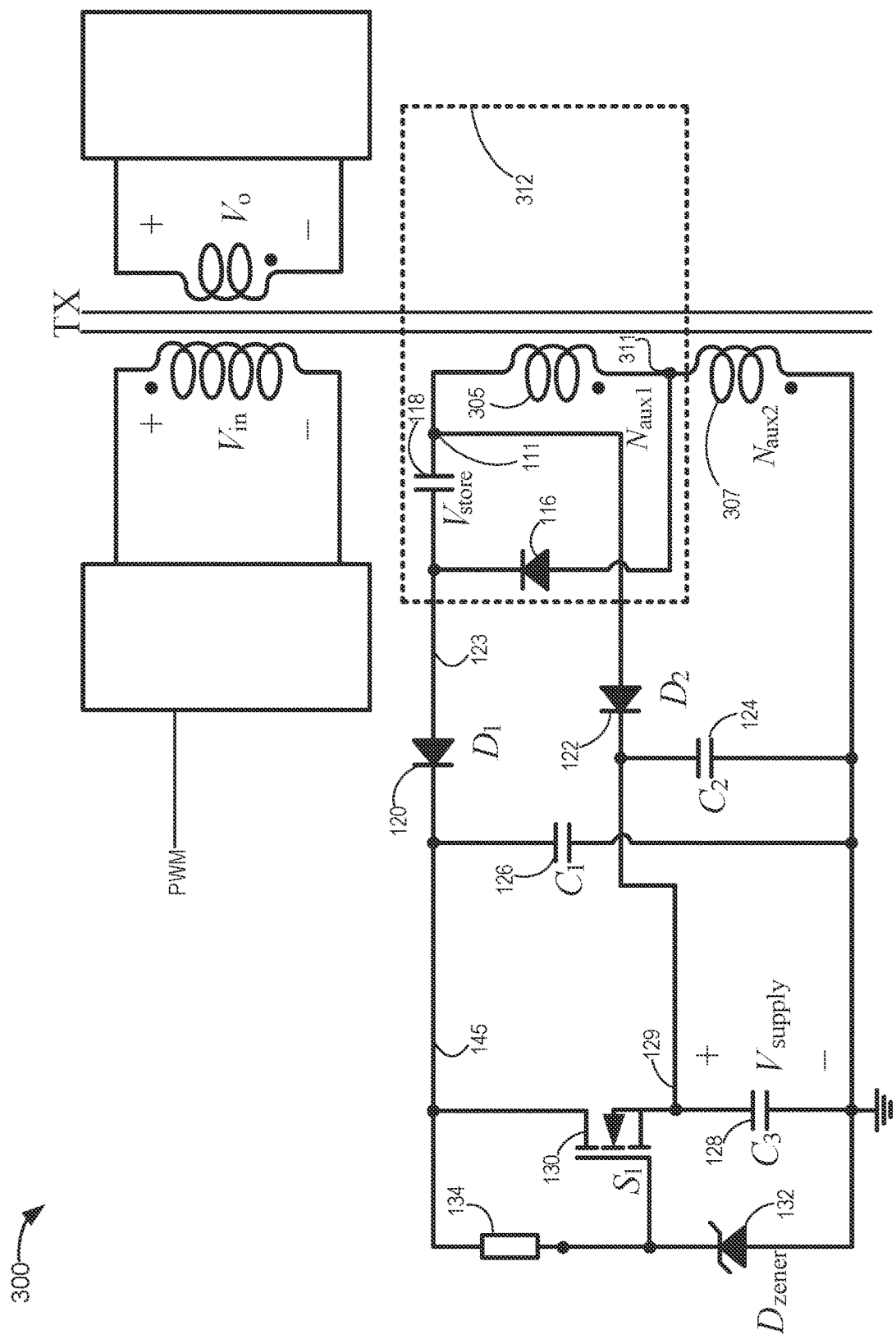
FIG. 3 illustrates an isolated DC-DC power converter circuit with an auxiliary power circuit where an auxiliary winding can be divided into two separate windings according to an embodiment of the disclosure.

Now turning to FIG. 3, an isolated DC-DC power converter circuit 300 is illustrated that is similar to the DC-DC power converter circuit 100, however the auxiliary winding has been divided into two separate windings, according to an embodiment of the disclosure. In the illustrated embodiment, the auxiliary winding can include a first auxiliary winding 305 (with number of turns $N_{aux1}$) and a second auxiliary winding 307 (with number of turns $N_{aux2}$). The first auxiliary winding 305 can be coupled to the second auxiliary winding 307 at a connection node 311. A charging circuit 312 can include the first auxiliary winding 305, capacitor 118 and diode 116. Capacitor 118 can be coupled to the first auxiliary winding 305 at a connection node 111. Anode of diode 116 can be coupled to the connection node 311 and cathode of diode 116 can be coupled to the capacitor 118. In this embodiment, the amount of energy stored on capacitor 118 can be reduced because the first auxiliary winding 305 (with relatively fewer windings) is connected to the capacitor 118, resulting in relatively lower voltage at node 123. In this embodiment, $V_{store}$ is given by:

$$V_{store} = \frac{N_{aux1}}{N_p} V_{in} \quad (5)$$

Thus, $V_{store}$ can be adjusted by modifying the number of turns $N_{aux1}$ in the first auxiliary winding 305. The total number of turns in the auxiliary winding can be reduced in this embodiment and the voltage at node 123 can be lowered. The reduction in the voltage at node 123 allows for the maximum voltage rating of the components such as diode 120, switch 130, capacitor 128, and diode 116 to be lowered, thus saving system costs and system size.

When the first auxiliary winding 305 is used as the charging auxiliary winding in the charging circuit 312, $N_{aux-c}=N_{aux1}$, and therefore the voltage amplitude $V_{high}$ at node 123 is given by:

$$V_{high} = \frac{N_{aux}}{N_s} V_o + \frac{N_{aux1}}{N_p} V_{in} \quad (6)$$

where $N_{aux}=N_{aux1} \pm N_{aux2}$. Thus, a relatively lower voltage can be obtained at node 123 because the second term in Eq. 6 can be lower. As appreciate by one of skill in the art, this method to divide the auxiliary winding into separate windings can be extended to divide the auxiliary winding into three or more windings in order to reduce the total number of auxiliary windings and obtain higher efficiency in the power converter.

Figure 4:
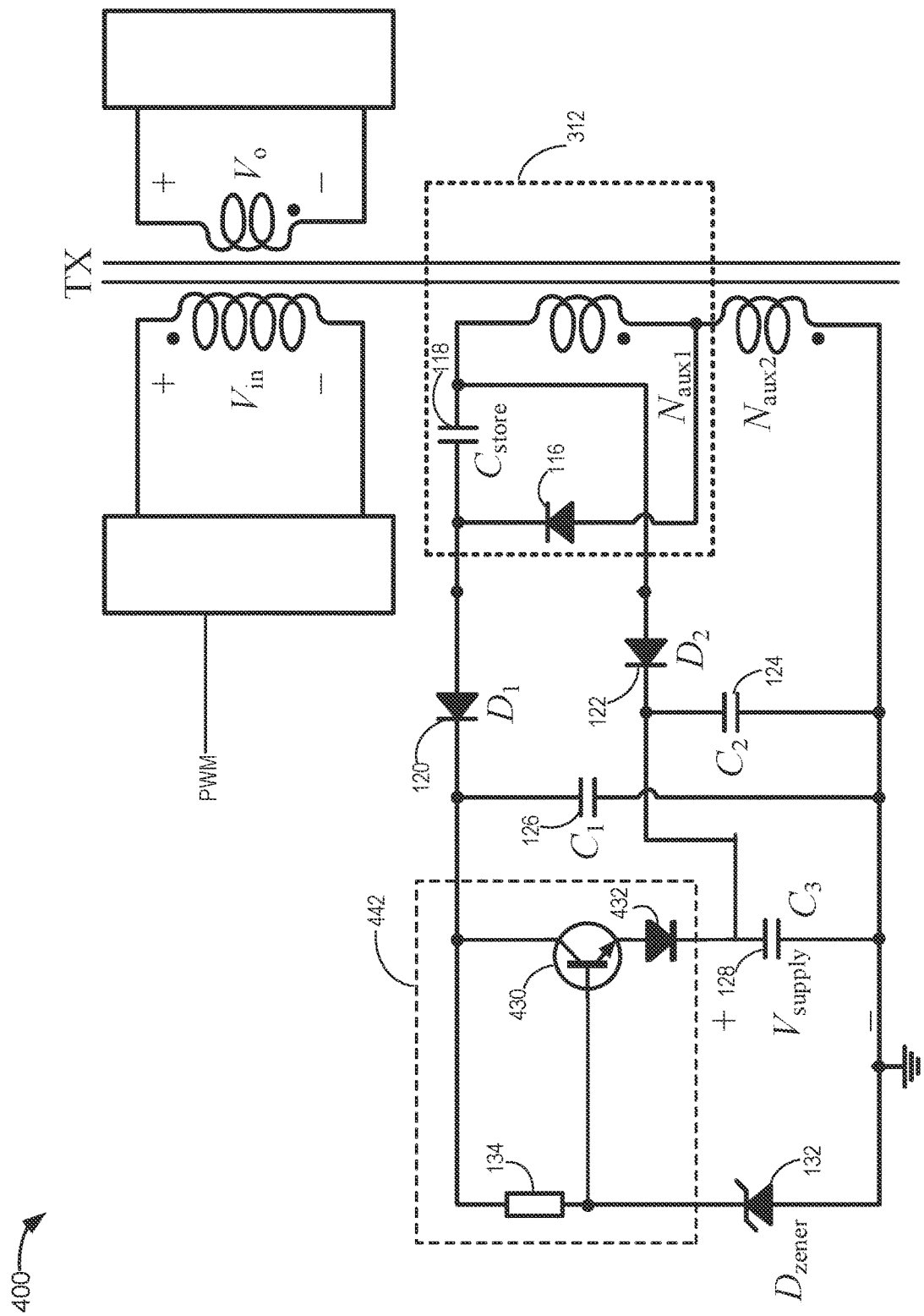
FIG. 4 illustrates an isolated DC-DC power converter circuit suitable for low voltage output applications with two auxiliary windings according to an embodiment of the disclosure.

Now turning to FIG. 4, an isolated DC-DC power converter circuit 400 is illustrated that is similar to the DC-DC power converter circuit 300, however the switch Si has been replaced by an NPN bipolar transistor 430, according to an embodiment of the disclosure. This embodiment can be suitable for relatively low output voltage applications. In the illustrated embodiment, an NPN bipolar transistor 430 and a diode 432 can be utilized to form the regulator 442. The NPN bipolar transistor 430 can have a relatively low on-voltage that is equal to its collector to emitter voltage (Vce). A low voltage drop across the collector to emitter of the NPN bipolar transistor 430 can reduce the voltage drop from node 145 to node 129. Thus, node 129 can operate down to relatively low output voltages, for example, 3.3 V. This low output voltage can be used in applications, such as but not limited to, for charging of portable devices or laptop computers.

In some embodiments, combination of the structures, circuits and techniques disclosed herein can be utilized to achieve a reduction in number of transformer auxiliary windings. Although structures, circuits and methods are described and illustrated herein with respect to one particular configuration of a transformer, embodiments of the disclosure are suitable for reducing number of windings in other transformer configurations, such as, but not limited to, planar and non-planar transformers in order to increase efficiency and reduce system costs.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A circuit comprising:
   a transformer having a primary winding, a secondary winding and an auxiliary winding having a first end and a second end, wherein the first end is directly coupled to a ground;
   a diode having a cathode and an anode, the anode coupled to the first end of the auxiliary winding; and
   a capacitor having a first terminal coupled to the second end of the auxiliary winding, and a second terminal coupled to the cathode.

2. The circuit of claim 1, wherein the diode is a first diode and wherein the circuit further comprises a second diode having a second anode and a second cathode, the second anode coupled to the second terminal of the capacitor.

3. The circuit of claim 2, further comprising a third diode having a third anode and a third cathode, the third anode coupled to the first terminal of the capacitor.

4. The circuit of claim 3, further comprising a switch having a gate terminal, a drain terminal and a source terminal.

5. The circuit of claim 4, wherein the switch is a metal-oxide-semiconductor field effect transistor (MOSFET).

6. The circuit of claim 4, wherein the switch is a bipolar junction transistor (BJT).

7. The circuit of claim 4, wherein the drain terminal is coupled to the second cathode and the source terminal is coupled to the third cathode.

8. The circuit of claim 7, wherein the gate terminal is coupled to a Zener diode.

9. The circuit of claim 8, further comprising a resistor coupled between the gate terminal and the second cathode.

10. A circuit comprising:
    a transformer having a primary winding, a secondary winding, and a first and second auxiliary windings, the first auxiliary winding having a first end and a second end, wherein the first end is directly coupled to a ground;
    a diode having a cathode and an anode, the anode coupled to the first end of the first auxiliary winding; and
    a capacitor having a first terminal coupled to the second end of the first auxiliary winding, and a second terminal coupled to the cathode.

11. The circuit of claim 10, wherein the first end of the second auxiliary winding is coupled to the second auxiliary winding.

12. The circuit of claim 10, wherein the diode is a first diode and wherein the circuit further comprises a second diode having a second anode and a second cathode, the second anode coupled to the second terminal of the capacitor.

13. The circuit of claim 12, further comprising a third diode having a third anode and a third cathode, the third anode coupled to the first terminal of the capacitor.

14. The circuit of claim 13, further comprising a switch having a gate terminal, a drain terminal and a source terminal.

15. The circuit of claim 14, wherein the switch is a metal-oxide-semiconductor field effect transistor (MOSFET).

16. The circuit of claim 14, wherein the switch is a bipolar junction transistor (BJT).

17. The circuit of claim 14, wherein the drain terminal is coupled to the second cathode and the source terminal is coupled to the third cathode.

18. The circuit of claim 17, wherein the circuit is arranged to receive an input voltage at the primary winding and generate an output voltage at the third cathode, the output voltage being substantially lower than the input voltage.

19. The circuit of claim 17, wherein the gate terminal is coupled to a Zener diode.

20. The circuit of claim 19, further comprising a resistor coupled between the gate terminal and the second cathode.

* * * * *